United States Patent [19]
Griffin et al.

[11] Patent Number: 5,859,755
[45] Date of Patent: *Jan. 12, 1999

[54] MAGNETIC TAPE RECORDING HEAD CLEANING APPARATUS

[75] Inventors: Edward E. Griffin, Edina; Jeffrey S. Thiessen, Plymouth; Hector F. Gonzalez, Rochester; Edwin W. Hazzard; Stephen A. Nunn, both of Rochester, all of Minn.

[73] Assignees: Geneva Group of Companies, Minneapolis, Minn.; International Business Machines Corporation, Armonk, N.Y.

[ * ] Notice: The term of this patent shall not extend beyond the expiration date of Pat. No. 5,748,418.

[21] Appl. No.: 958,539

[22] Filed: Oct. 27, 1997

Related U.S. Application Data

[63] Continuation of Ser. No. 475,809, Jun. 7, 1995, Pat. No. 5,748,418.

[51] Int. Cl.⁶ ...................................................... G11B 5/41
[52] U.S. Cl. ........................................... 360/128; 242/354
[58] Field of Search ..................................... 360/128, 137, 360/85, 95; 242/354, 356, 535.3; 15/DIG. 12, DIG. 13

[56] References Cited

U.S. PATENT DOCUMENTS

| | | | |
|---|---|---|---|
| 3,288,385 | 11/1966 | Markakis et al. | 242/55.11 |
| 3,615,155 | 10/1971 | Gelbman | 242/188 |
| 3,647,990 | 3/1972 | Eul, Jr. et al. | 360/128 |
| 3,789,452 | 2/1974 | Nemoto | 360/128 |
| 3,861,619 | 1/1975 | Wolff | 360/74.6 |
| 3,962,727 | 6/1976 | Kamimura et al. | 360/85 |
| 3,980,255 | 9/1976 | Serizawa | 242/347.1 |
| 4,091,426 | 5/1978 | Umeda | 360/132 |
| 4,173,319 | 11/1979 | Umeda | 360/132 |
| 4,408,241 | 10/1983 | Ogawa | 360/128 |
| 4,408,243 | 10/1983 | Bonner et al. | 360/128 |
| 4,573,091 | 2/1986 | Barton, Jr. et al. | 360/105 |
| 4,616,283 | 10/1986 | Clausen et al. | 360/128 |
| 4,630,152 | 12/1986 | Kilstofte | 360/105 |
| 4,692,830 | 9/1987 | Willburger | 360/128 |
| 4,751,600 | 6/1988 | Cecil et al. | 360/128 |
| 4,775,910 | 10/1988 | Rudi | 360/128 |
| 4,811,149 | 3/1989 | Causen | 360/128 |
| 4,941,065 | 7/1990 | Fritsch | 360/128 |
| 5,012,377 | 4/1991 | Siddio et al. | 360/128 |
| 5,021,911 | 6/1991 | Kingsbury | 360/128 |
| 5,742,461 | 4/1998 | Benson et al. | 360/128 |
| 5,748,418 | 5/1998 | Griffin et al. | 360/128 |

FOREIGN PATENT DOCUMENTS

| 1254 377 | 11/1967 | Germany . |
|---|---|---|
| 61-120320 | 6/1986 | Japan . |

OTHER PUBLICATIONS

IBM Technical Disclosure Bulletin, "Cleaning Cartridge Detection Device", vol. 34, No. 7A, pp. 91–92, Dec. 1991.

*Primary Examiner*—David L. Ometz
*Attorney, Agent, or Firm*—Moore & Hansen

[57] ABSTRACT

The present invention provides an apparatus using dry cleaning techniques for cleaning a read/write head of the contact transducing type such as found on computer data backup tape drive systems. The apparatus includes a housing enclosing a supply reel holding a supply of cleaning tape, a takeup reel for holding used or soiled cleaning tape, and a gear train for transmitting rotary power at a reduced rotational speed from an external power source such as the tape drive capstan to the takeup reel. The gear train includes a plurality of gears that constitute a gear reduction system such that the cleaning tape can be driven past the head at an effective cleaning speed which is substantially less than the normal read/write speed of the tape drive. The apparatus further includes a movable shutter mechanism for blocking one of a pair of light paths between a light emitter and a light sensor forming part of the tape drive system, thereby providing a unique signal to the tape drive. The shutter mechanism is activated upon insertion into the tape drive by the tensioning of the cleaning tape against the shutter mechanism so as to move it into operational, light-path blocking position against the influence of a biasing spring, thereby alerting the tape drive that a cleaning apparatus has been inserted into the tape drive so that the cleaning cycle operates for a tape drive manufacturer preferred time period.

15 Claims, 3 Drawing Sheets

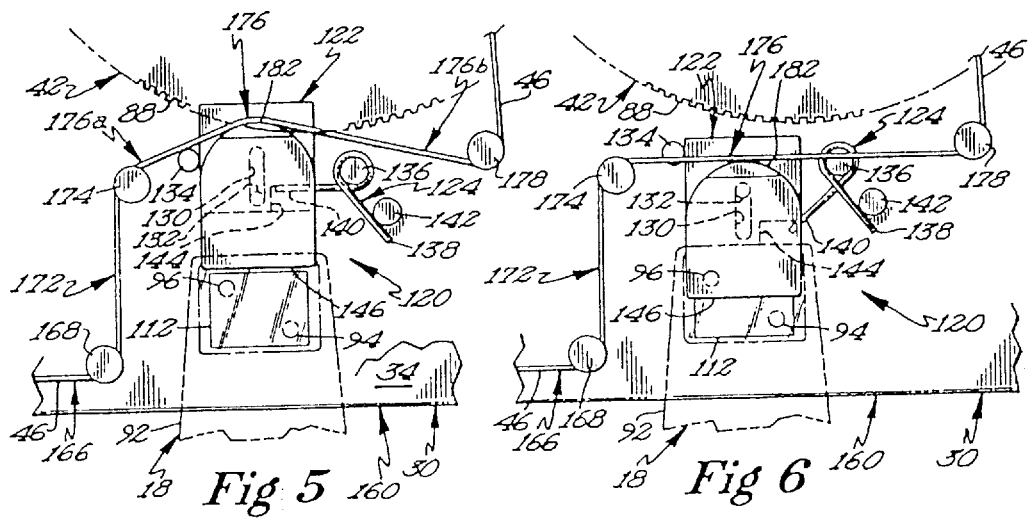

MAGNETIC TAPE RECORDING HEAD CLEANING APPARATUS

This is a continuation of application Ser. No. 08/475,809 filed Jun. 7, 1995, now U.S. Pat. No. 5,748,418.

The present invention relates in general to devices for cleaning read/write magnetic recording heads of the type used to read and write data on a magnetic media such as magnetic tape, for example. In particular, the present invention relates to a dry cleaning cartridge device useful for cleaning heads of the contact-transducing type such as those used on computer data backup systems that utilize magnetic tape as a data storage medium.

BACKGROUND OF THE PRESENT INVENTION

The contact-type transducer recording heads used to read and write data in backup drives of computers can become dirty with use. The accumulation of contaminants such as dust, debris, etc., on the heads can interfere with their normal operations, which can in turn lead to errors in the reading and the writing of the data from and to the magnetic tape. In addition, the magnetic recording tape engages the recording head under tension, leading to the erosion of the magnetic oxide particles forming the recording media from the recording tape and the subsequent emplacement of those eroded particles upon the head. These and other known sources of contamination make periodic cleaning of the head necessary if the head is to continue to operate properly. Proper cleaning is important since a dirty head—whether due to no cleaning at all or an ineffective cleaning—may result in a loss of data whose value is often inestimable.

Known head cleaning devices for magnetic recording heads include those disclosed in U.S. Pat. No. 3,789,452 to Nemoto; U.S. Pat. No. 4,408,241 to Ogawa; U.S. Pat. No. 4,751,600 to Cecil et al.; U.S. Pat. No. 4,755,910 to Rudi; U.S. Pat. No. 5,012,377 to Siddio; and Japanese Patent Nos. 60-10411, 60-170017, 2-35618, and 3-173912. The Nemoto and Ogawa patents appear to be directed principally to audio tape players, while the majority of the remainder of the aforementioned patents appear to be directed to cleaning read/write heads associated with computer hardware. Japanese 60-170017 and, in part, Siddio, appear to be directed to video applications.

The Cecil and Rudi patents disclose a head cleaner that comprises a sponge that is held in a cassette similar in size to that used to hold the magnetic tape. A cleaning solution is applied to the sponge which is reciprocated up and down upon the surface of the head by means of a crankshaft-type of mechanism driven by the capstan of the computer backup tape drive. Thus, to use the Cecil or Rudi cleaner, cleaning solution must be applied by hand to the sponge, after which the cassette is inserted into the tape drive for the cleaning process. Cleaning continues until the cleaning cassette is removed from the tape drive.

While potentially valuable as a head cleaning aid, the Cecil/Rudi types of cleaning devices suffer from several well recognized deficiencies. For example, the length of time that the cassette is in the backup drive cleaning the head is determined solely by the end user or customer. The ability of anyone—manufacturer or customer—to control the quality of the cleaning of a single unit let alone an entire product line in a consistent manner is minimal as a result. In addition, because these kinds of cleaning devices wipe generally the same area of sponge over the head repeatedly as the sponge is moved up and down over the surface of the head, the contaminants whose removal is desired may instead be smeared out over the head and only partially removed. Yet another shortcoming in the ability to control the quality of cleaning that these types of cleaners provide is that they each rely upon the placement of a specific amount of cleaning solution on the sponge. Putting too little solution on the sponge may result in an ineffective cleaning. If too much solution is placed on the sponge, however, the excess cleaning solution may be squeezed out of it when the sponge is placed into contact with the head, thereby causing the cleaning solution to drip off the sponge into the interior of the tape drive and creating the potential for damaging the tape drive or other electronic equipment associated therewith.

A final deficiency of the Cecil/Rudi type of device is that, with presently available equipment, the need for the addition of the cleaning solution to the sponge means that human intervention is required in what could otherwise be an automated process. Thus, this deficiency is a particular hinderance to the use of these types of wet cleaning devices in data library systems where robotic arms are otherwise used to manipulate the data cassettes and to insert and remove them from tape drives. This need to add the solution to the sponge by hand therefore, prevents the cleaning process from being performed by robotics according to a pre-established cleaning schedule.

Dry cleaning techniques, rather than the aforementioned wet cleaning techniques are also known. Thus, as shown in Nemoto, which as noted is directed to an audio application, a dry cleaning tape formed of a woven material is used to remove contaminants from a read/record head of an audio player. The cassette is inserted into the audio tape drive and the takeup reel is driven directly by the drive of the audio unit. In this type of cleaning cassette, the contaminants are caught by the interstitial gaps that exist between the threads in the weave of the cleaning tape. While effective in this particular application, such cleaning devices have been generally considered ineffective for use in a computer tape backup drive system because the drive speed of the cleaning tape past the read/write head generally lies between ninety (90) and one hundred twenty (120) inches per second (ips), the normal range of operational speed of such tape drives when reading or writing data. This speed is too great to clean the head of a computer backup tape drive effectively. Additionally, because these types of dry cleaning tapes can be generally rewound, they can be reused over and over again, thus eliminating any ability of the manufacturer of the cleaning tape to control the quality and effectiveness of the cleaning process. Again, this feature of this type of cleaning device makes it undesirable for use in the computer tape drive backup system application where suitable cleaning is essential for a properly operating recording head.

It would be desirable to have a new and improved head cleaning device that utilizes dry cleaning rather than wet cleaning techniques to remove contaminants from a read/write head; that cooperates with a tape drive to indicate that a cleaning media rather than a data media has been inserted into the tape drive; that does not rely upon cleaning the head with an already used cleaning surface; that does not rely upon the customer to unwittingly use the cleaning device a proper length of time; and that cannot be reused when the supply of cleaning tape has been used once.

SUMMARY OF THE PRESENT INVENTION

It is an object of the present invention to provide new and improved apparatus that is not subject to the foregoing disadvantages.

It is another object of the present invention to provide a new and improved apparatus for removing contaminants from a contact-type transducing head used to read and write data from and to a data storage medium.

It is yet another object of the present invention to provide an apparatus of the aforementioned type in the form of a dry-cleaning cartridge that is insertable into a tape drive of a computer tape drive data backup system.

It is still another object of the present invention to provide apparatus of the aforementioned type that cooperates with a backup tape drive to drive a cleaning tape past the head at a predetermined speed to safely and effectively clean the head.

It is still yet another object of the present invention to provide apparatus of the aforementioned type that includes a unique cleaning tape path within a housing such that the tape does not obstruct the light path between a light source and light sensor normally utilized to indicate, in part perhaps, the beginning or end of a data storage tape.

It is another object of the present invention to provide a unique indicator means in the form of a movable shutter that obstructs one of a pair of light paths between a tape drive pair of light sources and their respective light sensors so as to provide a unique signal indicating that the cleaning apparatus has been inserted into the computer tape drive data backup system.

It is still another object of the present invention to provide a speed reduction means in the form of a gear reduction system that reduces the speed of passage of the cleaning tape past the read/write head to a desired cleaning speed.

It is yet another object of the present invention to provide a head cleaning apparatus that drives a dry cleaning tape past the head via a power transmission extending between the capstan of the tape drive and the takeup reel of the cleaning apparatus.

It is still yet another of the present invention to provide a manufacturer quality controlled cleaning of a contact-type transducer head such as that found on a computer tape drive data backup system.

It is an object of the present invention to provide a new and improved dry cleaning cartridge suitable for use in data library systems where the data cartridges are manipulated by robotic means.

It is yet another object of the present invention to provide a cleaning cartridge for a computer tape drive data backup system that does not rely upon human intervention to add a cleaning fluid to the cleaning cartridge or to control the length of time that the cleaning cartridge is in the tape drive.

It is still yet another object of the present invention to provide a cleaning apparatus of the dry tape type that may be used only for a predetermined number of cleanings and may not be reused.

The foregoing objects of the present invention are provided by an apparatus for dry cleaning the read/write head of a tape drive such as that found in a computer data backup system. The apparatus includes a housing enclosing a supply reel that holds a supply of cleaning tape; a predetermined tape path followed by the cleaning tape from the supply reel to a take-up reel; indicating means for providing an indication to the tape drive that the cleaning apparatus has been inserted into the tape drive; and means for receiving driving power from an external power source, such as the capstan of the tape drive, and for transmitting the driving power at a reduced rotational speed so as to drive the cleaning tape at a desired, predetermined speed past the head. Preferably, the receiving and transmitting means transmits the driving power to the take-up reel rather than to a tensioned band such as is used in prior art computer backup cartridge tapes to drive the recording tape past the head.

In one embodiment of the present invention, the receiving and transmitting means includes a gear train that cooperates with the capstan of the tape drive to receive driving power therefrom and to drive the cleaning tape past the head under a tensioned engagement therewith so as to clean the head and otherwise remove the contaminants therefrom. In a further refinement of this embodiment, the gear train includes a gear reduction system having a plurality of gears providing a pre-determined speed reduction between the capstan and the take-up reel, thereby ensuring that the cleaning tape moves past the cleaning head at a desired, effective cleaning speed.

An indication means in accordance with the present invention may include a shutter that prevents light signal transmission to one of the two conventional light sensors in a conventional tape drive beginning-of-tape/end-of-tape sensor system, thereby providing a unique sensor signal recognizable by the control for the tape drive system as indicating that a cleaning apparatus has been inserted into the tape drive. In the embodiment of the present invention disclosed herein, the shutter may be biased into a non-operational position and moved into operational position upon the cleaning tape bearing against the shutter as it is tensioned by the initial rotation of the capstan. As part of the indicator means the predetermined path of the cleaning tape prevents the tape from obscuring in any manner the conventional tape drive sensing system, unlike the present recording tapes.

In a preferred embodiment, the tape drive control system, upon sensing the presence of the cleaning apparatus, will slow the capstan rotational speed from a conventional tape driving speed (such as 90 to 120 inches per second, dependent upon the manufacturer) to a predetermined reduced tape driving speed (such as 53 ips). The gear reduction system will further slow the passage of cleaning tape past the tape head to a desired cleaning speed (such as 2.4 ips).

The foregoing objects and advantages of the invention will become readily apparent as the following description is read in conjunction with the accompanying drawings wherein like reference numerals have been utilized to designate like elements throughout the several drawing views.

BRIEF DESCRIPTION OF THE DRAWINGS

FIG. 5 illustrates in plan view a shutter mechanism of the present invention in a non-operational or rest position;

FIG. 6 illustrates the shutter mechanism shown in FIG. 5 in an operational position; and FIG. 7 depicts in plan view the apparatus of FIG. 1 in place relative to certain component parts found in typical computer data backup drives, with several of those component parts of the backup drive being shown in phantom outline.

DETAILED DESCRIPTION OF THE PRESENT INVENTION

Figure 1:
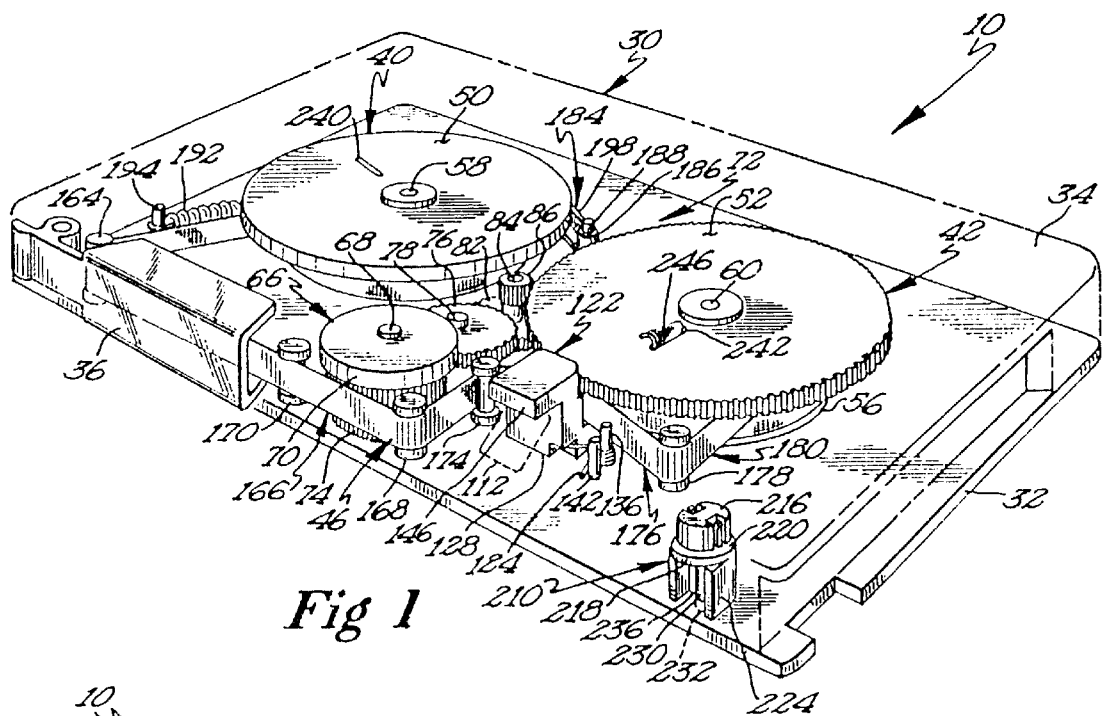
FIG. 1 illustrates in a perspective, partially phantom view, a dry cleaning cartridge apparatus in accordance with the present invention.

A dry cleaning cartridge 10 in accordance with the present invention is shown illustrated in FIGS. 1–7. In particular, FIG. 7 shows a cleaning tape cartridge 10 in accordance with the present invention in place in a tape drive 12 of the type commonly found in computer data backup systems, the tape drive 12 being generally shown in phantom outline. The tape drive 12 includes, among other items not shown—such as the drive motor—a read/write head 14 used to read data from a tape and record data thereon, a capstan 16 normally used to drive a recording tape past the head 14, a beginning-of-tape/end-of-tape (BOT/EOT) sensor assembly 18 normally used to indicate to the tape drive controller (not shown) that the beginning or end of the recording tape has been reached, and a read/write or file protect switch 20, which is activated by the cartridge 10 and which is normally used to indicate that the cartridge in the tape drive can or cannot have data written to it by the head 14 as will be explained in greater detail below.

Figure 2:
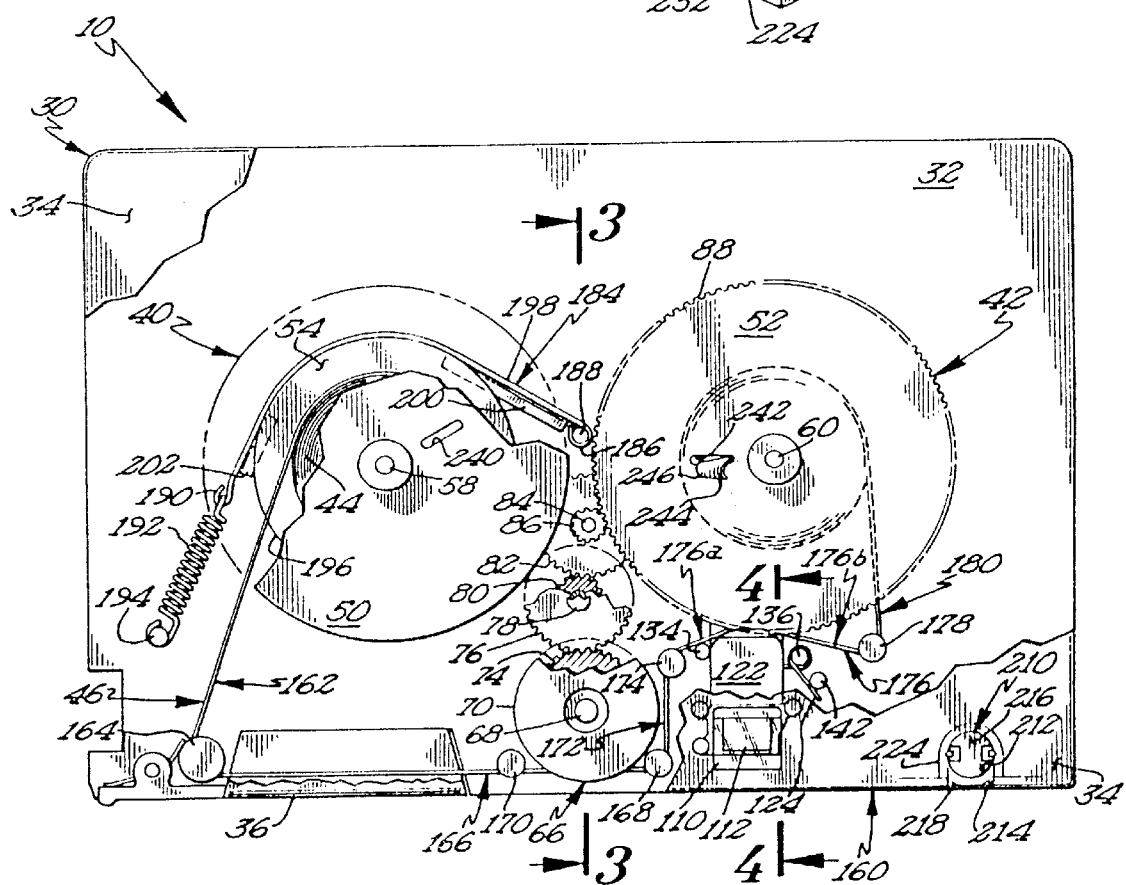
FIG. 2 shows the apparatus of FIG. 1 in a top plan view.

Referring now particularly to FIGS. 1 and 2, cartridge 10 includes a housing 30 comprising a bottom plate 32 and a cover 34, which are fastened using known means. Cover 34 is shown substantially in phantom in FIG. 1 and includes an access door 36 pivotably attached to plate 32 such that it may be swung open for access to the interior of cartridge 10 by head 14, as shown best in FIG. 7. The general configuration of housing 30 will preferably match that of known data storage cartridges since dry cleaning cartridge 10 must fit within commercially available equipment such as tape drive 12 as shown in FIG. 7.

Cartridge 10 includes a supply reel 40 and a take-up reel 42, each of which are mounted for rotation within housing 30. Supply reel 40 holds a supply 44 of unused cleaning tape 46. Cleaning tape 46 follows a predetermined path from supply reel 40 to take-up reel 42 as will be described below. Supply and take-up reels 40 and 42 each include, as is well known in the art, a central hub, such as hub 48 of take-up reel 42 20 (FIG. 3) upon which the cleaning tape 46 is wrapped, and upper rims 50, 52 and lower rims 54, 56, respectively. Thus the cleaning tape 46 is wound on the hub of supply reel 40 between upper and lower rims 50 and 54, thus forming the aforementioned supply 44 of cleaning tape while the used cleaning tape is wound on the hub 48 of take-up reel 42 between upper and lower rims 52 and 56 thereof respectively, all as is well known in the art. It should be noted that the reference to "upper" and "lower" in regard to the rims 50, 52, 54 and 56 simply denotes their presentation in the drawings herein and is not intended to indicate any preferred orientation since tape drives may be mounted or placed in operating position such that the rotation axis of the reels 40, 42 may assume other than a vertical orientation. Supply and take-up reels 40 and 42 are mounted for counterclockwise rotation by pins 58 and 60 respectively, which are fixedly attached to bottom plate 32 of housing 30.

As seen in FIG. 7, access door 36 is mechanically opened upon insertion of cartridge 10 into tape drive 12. Cleaning tape 46 engages head 14 under tension when cartridge 10 is properly disposed within tape drive 12. Power to drive or pull cleaning tape 46 past head 14 is derived from an external power source such as the capstan 16 of tape drive 12. Capstan 16 is rotationally driven by an electric motor (not shown) in a manner well known to the art. Capstan 16 comprises a wheel 62 mounted for rotation within tape drive 12 and having a smooth, substantially planar engagement surface 64 mounted for rotation within tape drive 12. Surface 64 frictionally engages a similarly smoothly surfaced wheel 66 rotationally mounted within housing 30 by means of a pin 68. Thus, capstan drive wheel surface 64 frictionally engages the smooth surface 70 (FIGS. 1, 3) of driven wheel 66. Driving power is transmitted to takeup reel 42 by a gear train 72. Gear train 72 together with wheel 66 comprise a means for receiving driving power from an external power source, here capstan 16, and transmitting it to takeup reel 42. Gear train 72 includes a plurality of individual gears and is preferably a gear reduction system for reducing the rotational speed of the takeup reel to a desired speed so as to provide an effective cleaning of head 14.

Figure 3:
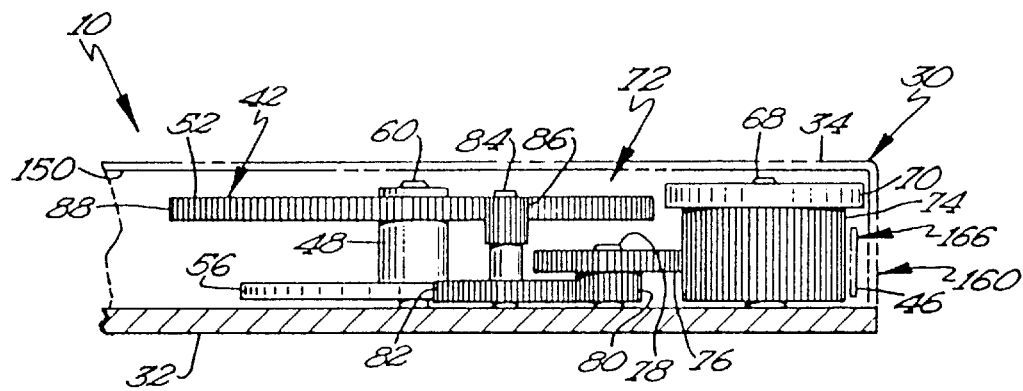
FIG. 3 depicts the apparatus of FIGS. 1 and 2 taken along cutting plane 3—3 of FIG. 2.

Referring particularly now to FIGS. 2 and 3, gear train 72 will be described further. Thus, gear train 72 includes a first spur gear 74 fixedly mounted concentrically with driven wheel 66. Wheel 66 and gear 74 are preferably unitarily molded from a synthetic material. Gear 74 rotationally engages a spur gear 76 mounted for free rotation about a flange pin 78. A spur gear 80 is integrally concentrically mounted to gear 76 so as to turn simultaneously therewith about pin 78. Spur gear 80 rotationally engages a spur gear 82 mounted for rotation about a pin 84. A spur gear 86, which is integral with gear 82, engages teeth 88 formed on the upper rim 52 of takeup reel 42. Upper rim 52 therefore forms the last gear in the gear train 72 extending between the driven wheel 66 and the takeup reel 42. Thus, rotation of capstan 16 will drive takeup reel 42 at a reduced rotational rate, thereby pulling cleaning tape 46 past head 14 at a speed substantially less than a data storage tape is normally driven by the head 14.

As previously noted, data storage tapes are normally driven by read/write heads within a speed range of 90 to 120 ips depending upon the manufacturer of the tape drive. Because this speed is considered too great to clean a head effectively with a dry cleaning tape, it is necessary to reduce the speed of the cleaning tape past the head. While this could be accomplished completely with a gear reduction system of the type disclosed herein, relying solely on a gear train to reduce the speed of passage of the cleaning tape past the head would require a different unit for each of the types of tape drives currently marketed or to be marketed in the future, which obviously increases manufacturing costs and reduces overall quality control as the number of different models increases. Thus, it is desirable to manufacture a cleaning cartridge according to the present invention that is capable of reducing the speed of passage of the cleaning tape past the head from a predetermined known speed to a predetermined reduced cleaning speed. To do this, tape drives, such as the drive 12, can be manufactured such that the drive motor for the capstan 16 will reduce the driving speed of the capstan 16 from its reading/writing speed to a first predetermined reduced speed. Accomplishing this speed reduction through either software or hardware is well within the skill of those knowledgeable in the art of controlling electric motors, the details of which will not be discussed further herein.

To illustrate this point, Tandberg Data A/S, a Norwegian company, presently manufactures a substantial share of the world market of 5 ¼" form factor, ¼ inch tape drive family, QIC1000 format and beyond of which IBM purchases a substantial portion and then resells. It has been found that the Tandberg 1.2 gigabyte drive can be programmed to operate such that the capstan would drive a tape past the head 14 at a speed of about 53 ips. A cleaning cartridge 10 according to the present invention will reduce that drive speed to an effective cleaning speed of about 2.4 ips, an effective reduction of about 22:1. It should be noted here that the 2.4 ips is not an optimal cleaning speed but that it lies within a range of speed of passage of the cleaning tape past head 14. Since takeup reel 42 is being driven at a constant rotational speed, as the dirty cleaning tape is would up on hub 48 thereof, the amount of tape being pulled past head 14 for each rotation of takeup reel 42 will increase incrementally with each rotation thereof. Thus, the speed of passage of cleaning tape 46 past head 14 will gradually increase as the cleaning cartridge 10 is used. Preferably, the speed that the cleaning tape passes head 14 will fall within a range of about 2.0 ips to about 3.0 ips. For example, takeup reel 42 can be driven at a reduced speed of 48 rpm through the combination of the reduced drive speed and the gear reduction so as to produce the tape speed range of about 2.0 to about 3.0 ips. Preferably, the combination of the gear reduction and reduced tape drive motor drive speed should result in a takeup reel rpm in the range of about 40 to about 56 rpm. The exact rpm of the takeup reel can vary within the foregoing range and still provide an effective cleaning of the head 14. The rpm speed can vary for a number of reasons, including the thickness of the cleaning tape 46 and the diameter of the pin 60/hub 48 combination of takeup reel 42 among others, and thus any combination of a gear train and/or reduced tape drive motor driving takeup reel 42 is within the scope of the present invention.

To manufacture dry cleaning cartridge 10 so that it can be used with a wide variety of tape drives, it is necessary that means be provided for indicating to the tape drive that a cleaning device has been inserted therein. To accomplish this, a cleaning apparatus 10 in accord with the present invention takes unique advantage of the already in place BOT/EOT sensing system found in such tape drives. This system will work in conjunction with the aforementioned programming of the drive motor of the tape drive to reduce the drive speed to a predetermined first reduced speed whenever a cleaning tape is sensed by the tape drive.

Figure 4:
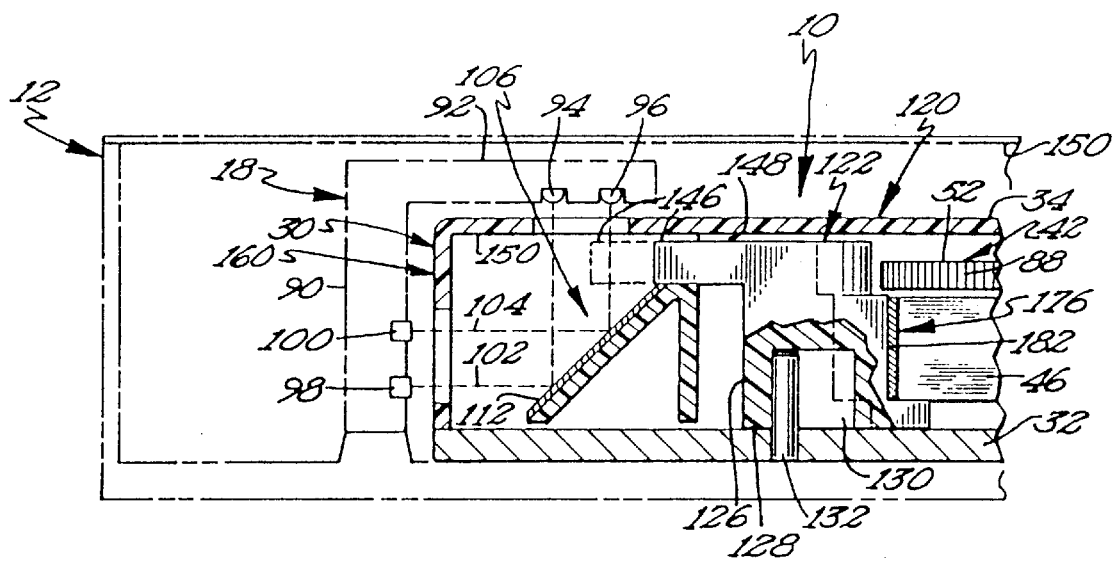
FIG. 4 shows the apparatus of FIGS. 1 and 2 taken along cutting plane 4—4 of FIG. 2.

To understand the present cleaning cartridge indicator means of the present invention, a brief description of the BOT/EOT sensing system would be helpful. Referring now principally to FIG. 4 but also to FIG. 7, it can be seen that a BOT/EOT system 18 includes an upright member 90 and a horizontal, cantilever member 92. Again, it should be noted that the terms "upright" and "horizontal" refer to the particular orientation of the drawings and it is noted that the tape drive 12 can be so mounted for operation as to place the members 90 and 92 in an alternative relation to each other and the environment. Member 92 includes first and second light sources or emitters 94 and 96. Member 90 includes first and second sensors 98 and 100 respectively optically coupled along light paths 102 and 104 by a reflector 106. Reflector 106, as shown, is similar to that found on commercially available data storage cartridges and comprises an upright member 108 and a member 110 disposed at an angle thereto so as to optically couple emitters 94 and 96 with sensors 98 and 100, respectively. As shown in FIG. 4, where the emitters and sensors are so disposed that the light paths 102 and 104 include a ninety degree bend, member 110 is preferably disposed at a forty-five degree angle to member 108 and members 90 and 92. Member 110 has a reflective surface 112 disposed thereon and presented to emitters 94 and 96 so as to reflect received light signals to sensors 98 and 100 respectively.

Conventional data storage media is opaque to the light emitted by emitters 94 and 96. Thus, under normal reading/writing operations, the tape in a conventional, commercially available data cartridge blocks the receipt of light by sensors 98 and 100. In these conventional data storage tapes, the beginning and end of the tape each include a plurality of perforations that selectively allow the light emitted by emitters 94 and 96 to reach sensors 98 and 100, thereby providing an indication of the type of tape in the drive and that the beginning or end of the tape has been reached. Such a system is necessary since data is recorded on one of a plurality of tracks on the data storage tape at a time. Thus, when the end of the tape is reached, as is well known in the art, it is necessary to move the head 14 transversely as indicated by arrow 114 (shown partly in phantom in FIG. 7 to indicate motion into and out of the plane of the Figure) relative to the direction of tape travel as indicated by arrow 116 so as to enable the head to read/write on the next track. The perforations on the tape provide a signal to the tape drive that head movement is necessary at specific times so as to continue the then presently ongoing read/write operation. The interpretation of the receipt of the light signals through the perforations is handled by software or hardware utilized by the tape drive 12 in a well known manner to the art and will not be explained further here.

To take advantage of the presently utilized BOT/EOT sensing system 18 so as to indicate to the tape drive 12 that a cleaning cartridge 10 has been inserted therein and that cleaning operations are to be undertaken, the present invention provides a unique means of providing a unique signal to the tape drive 12, thereby indicating that the cartridge 10 has been inserted therein. Part of this unique means includes the predetermined path followed by the cleaning tape 46 through the housing 30 as will be described further below. Thus, referring now to FIGS. 4, 5, and 6, a cleaning cartridge indication means 120 will now be described. Briefly, means 120 provides apparatus for continually blocking one of the light paths 102, 104 while leaving the other light path continually open. As shown best in FIG. 4, in the embodiment of the present invention illustrated herein, light path 104 between light emitter 96 and sensor 100 will be blocked by the movement of a shutter mechanism 122 from a rest or non-operational position to an operational position shown in phantom while light path 102 will remain open to the continuous passage of light between emitter 94 and sensor 98. Since the data storage tapes provide BOT/EOT indications through a set of perforations in the tape, thus providing a series of light on—light off situations along each light path, the present means 120 provides a unique signal where one light is "on", that is, sensed, continuously, while the other light is "off," that is, not sensed, continuously. Thus, when this situation is sensed by the tape drive 12 through BOT/EOT sensing means 18, tape drive 12 will "know" through its programing that a cleaning cartridge 10 has been inserted therein and will automatically reduce the drive speed of the capstan 16 to the aforementioned first reduced speed, such as 53 ips.

Having described how means 120 provides an indication that a cleaning cartridge has been inserted into the tape drive 12, means 120 will now be further described. As noted, means 120 includes a movable shutter mechanism 122. Shutter mechanism 122 is shown in a rest or non-operational, i.e., not in the tape drive 12, position in FIG. 4 and FIG. 5. Shutter mechanism 122 is movable from its rest position to an operational position shown in FIG. 6 and also in phantom in FIG. 4. Shutter mechanism 122 is normally biased into its rest or non-operational position by a biasing means such as torsion spring 124. Shutter mechanism 122 includes a post 126 having a substantially planar bottom surface 128 that slides on bottom plate 32. Bottom surface 128 includes a guide slot 130 that receives a slot guide pin 132 attached to bottom plate 32. Slot 130, slot guide pin 132 and a guide pin 134, which acts to inhibit rotation of shutter mechanism 122 due to the force exerted by spring 124, cooperate to ensure that shutter mechanism 122 slides in a linear fashion with little or no rotation thereof about slot guide pin 132. As best seen in FIGS. 5 and 6, spring 124 is mounted around a pin 136 and has ends 138 and 140 that respectively bear against a pin 142 and a recess 144 in the side of shutter mechanism 122. Shutter mechanism 122 also includes a shelf 146 extending outwardly therefrom. Shelf 146 is configured to be received within the gap 148 formed between the top of reflector 106 and the inner surface 150 of cover 34. As best seen in FIG. 4, when shutter mechanism 122 has been moved to its operational position shown in phantom, shelf 146 blocks the light path from emitter 96 to sensor 100 but does not obstruct the light path from emitter 94 to sensor 98.

To continue the description of means 120 it is necessary to describe the path of the cleaning tape 46 through the housing 30 since it is the cleaning tape 46 that moves the shutter mechanism 122 against the biasing influence of spring 124 as will be explained further below. It will thus be helpful to describe the cartridge 10 as including a tape engagement side 160 (FIG. 2), that is, a side of apparatus 10 wherein the cleaning tape 46 is presented for engagement with head 14. It will also be helpful to contrast the dry cleaning cartridge 10 with conventional, commercially available data storage tapes. These latter tapes have a tape path through the housing that extends from one reel toward the engagement side of the data storage tape, runs parallel thereto for substantially the entire length of the engagement side and then towards the other reel. The parallel path segment extends between the reflector contained within the data tape housing and the housing side wall so as to continually obstruct the light paths between the light emitters 94, 96 and their respective sensors 98, 100 except when the aforementioned perforated tape segments are reached at a BOT/EOT situation. Thus, such a data storage tape has three separate path segments.

In the embodiment of a head cleaning apparatus such as that shown in FIGS. 1–7, and as best seen in FIG. 2, the cartridge 10 includes a plurality of tape path segments defined by appropriate cornering and positioning pins, including two separated path segments that run substantially parallel to the engagement side 160 of cartridge 10. The predetermined cleaning tape path includes a first segment 162 extending from supply reel 40 toward engagement side 160. Cleaning tape 46 then passes around a corner pin 164. A second path segment 166 extends from corner pin 164 substantially parallel to engagement side 160 to a corner pin 168. Path segment 166 passes by access door 36, which, as noted previously and as is shown schematically in FIG. 7, opens after cartridge 10 is inserted into tape drive 12 such that head 14 may be moved into contact therewith. Path segment 166 also passes beneath wheel 66 and between gear 74 and the engagement side 160. It should be noted that a positioning pin 170 is disposed along path segment 166 and together with corner pin 168 spaces the cleaning tape 46 from gear 74 so as to avoid any contact therewith that might result in damaging wear on the cleaning tape or dislodging of the contaminants removed from the head 14 by the cleaning tape as it passes thereby particularly when head 14 engages cleaning tape 46 as seen in FIG. 7. A third path segment 172 extends from corner pin 168 away from engagement side 160 toward takeup reel 42 and to a corner pin 174. A fourth path segment 176 extends from corner pin 174 behind shutter mechanism 122 and between mechanism 122 and takeup reel 42 to a corner pin 178. A fifth path segment 180 extends from corner pin 178 away from engagement side 160 to takeup reel 42.

Referring now to FIGS. 5 and 6, and recalling that FIG. 5 shows the non-operational or rest position of shutter mechanism 122 and that FIG. 6 shows the operational position of shutter mechanism 122, it can be seen that in the rest position that fourth path segment 176 includes two substantially straight path portions 176a and 176b. Portion 176a extends from corner pin 174 to its contact with shutter mechanism 122 and path portion 176b extends from shutter mechanism 122, to corner pin 178. Cleaning tape 46 thus bears against the backside 182 of shutter mechanism 122 along the fourth path segment 176. Backside 182 preferably has a curved configuration so as to avoid the presentation of sharp edges to cleaning tape 46. By backside, it is meant the side of shutter mechanism 122 opposite engagement side 160. In the rest position shown in FIG. 5, when cleaning tape 46 is under little or no tension, biasing spring 124 has sufficient strength to bias the shutter mechanism 122 into its rest position, resulting in the two angularly disposed path portions 176a and 176b. In operation, as shown in FIG. 6, cleaning tape 46 is placed under tension, resulting in the straightening of path segment 176 and the expression of a force opposing spring 124 that forces shutter mechanism 122 to move toward engagement side 160 and thereby causes shelf 146 to block light path 104 between light emitter 96 and sensor 100. During operation, then, path segment 176 assumes a substantially parallel orientation relative to engagement side 160 due to tension placed thereon in the manner to be described hereafter.

Upon insertion of a dry cleaning cartridge 10 in accordance with the present invention into a tape drive 12, capstan 16 will normally rotate a specific number of revolutions, such as five, six or seven. Through the gear train previously described this rotary motion will be transferred to the takeup reel 42 which will revolve in turn, thereby taking up slack in the tape 46 between the supply and takeup reels. The tape will be placed under tension by this rotation since the supply reel 40 is not free to turn, That is, supply reel 40 is inhibited from freely rotating by a restraining means 184 best seen in FIG. 2. Means 184 includes a friction band or brake having a looped end 186 received by a pin 188 and a looped end 190 attached to a biasing means such as spring 192. Spring 192 in turn is attached to a pin 194. Friction band 184 frictionally engages lower rim 54 of supply reel 40 along its circumferential edge 196. Spring 192 serves to hold friction band 184 tightly against circumferential edge 196, thereby inhibiting the tendency of the supply reel 40 to rotate freely and thus to aid in the application of tension to cleaning tape 46. Friction band 184 includes a side 198 and a pair of flanges 200 and 202 that extend substantially transversely away from side 198 and under lower rim 54 of supply reel 40. When takeup reel 42 is rotated by capstan 16 through the action of the gear train, supply reel 40 will be restrained from rotation by the force exerted against lower rim 54 by friction band 184, thereby causing cleaning tape 46 to be forcefully pulled from supply reel 40 and placing cleaning tape 46 in tension, which as previously noted serves to move shutter mechanism 122 forward to block light path 104. Flanges 200 and 202 are separated by a gap corresponding to the radius of the lower rim 54 of supply reel 40. Friction band 184 can therefore be easily manufactured as a substantially straight item of equipment and then bent around the circumferential edge 196 during assembly. Flanges 200 and 202 also aid in keeping supply reel 42 in place during shipment.

It should also be noted that cleaning tape 46 must engage head 14 under tension in order to bear forcefully enough against the head 14 to remove contaminants therefrom. Thus, as seen in FIG. 7, when head 14 engages cleaning tape 46 along second path segment 166, this path segment will be deformed into two angularly disposed portions.

Referring now to FIGS. 1, 2, and 7, it will be seen that apparatus 10 includes a contamination insert 210. Insert 210 is received within housing 30 where the rotatable file protect switch is normally positioned in known, commercially available data storage tapes. This switch interacts with the previously mentioned file/protect switch 20 in a data storage cartridge to inform the tape drive whether data can or cannot be written thereto. Since data will not be written to cleaning cartridge 10, such a rotatable switch is not necessary. Since cleaning cartridge 10 will, however, preferably utilize the same cover 34 as found on commercially available data storage cartridges, the aperture 212 in cover 34 that receives such a file protect rotatable switch should be filled to keep contaminants from entering the housing 30 and being inadvertently placed on the head 14 by the cleaning tape 46. Insert 210 is therefore sized to be sealingly received by cover aperture 212 and to block or seal the opening 214 that exists therein along engagement side 160, that is, the front side wall of cover 34. Insert 210, unlike the file protect switch found on conventional data storage tapes will, however, be incapable of rotation.

As best seen in FIGS. 1, 2 and 7, insert 210 has an upper, substantially cylindrical knob 216 received by aperture 212. Knob 216 is integral with an upper plate 218 whose upper surface 220 engages the inner surface 150 of the cover 34. Plate 220 in turn is integrally attached to a body portion 224. Body portion 224, as best seen in FIG. 7, has a cross sectional configuration of a flattened, or "race track" oval, with a missing end or side that opens into a central cavity 226. The flattened side has a pair of substantially flat side walls that engage the substantially flat interior surface of the engagement side 160 of the cover 34 so as to seal or block the opening therein to prevent contaminants from entering into the interior of the cartridge 10. The missing end therefore forms an opening 228 into the cavity 226. Within cavity 226 is a central post 230 that extends from upper plate 218 downwardly beyond the bottom of the body portion 218 so that its lower end can be inserted into an appropriately sized and disposed post receiving aperture 232 in bottom plate 32 of housing 30. Post 230 is integrally attached in this embodiment to the inside surface 234 of cavity 226 by one or more webs 236. As shown, one web 236 extends between the post 230 and the rear wall of the housing and a pair of webs 236 extend in opposign directions to the interior surface of the side walls. The open or missing side 228 of body portion 224 prevents file protect switch 20 from being activated when cartridge 10 is inserted into tape drive 12. The tape drive remains in a "read" rather than a "write" mode therefore.

Referring now to FIGS. 1 and 2, it can be seen that upper rims 50 and 52 of supply and takeup reels 40 and 42 each include a slot 240, 242, respectively. Slots 240 and 242 are normally used to anchor the free ends of the cleaning tape 46 as it is initially wound on the reels 40 and 42. As seen in the Figures, the free end 244 of cleaning tape 46 extends through slot 242 of takeup reel 42. Free end 244 will normally be anchored to the top surface of upper rim 52 by means such as adhesive tape 246 so as to retain it more or less permanently in that position throughout the useful life of the cleaning cartridge 10. The other end (not seen) of the cleaning tape will be anchored by adhesive tape to upper rim 50 of supply reel 40 only during the initial winding of the cleaning tape thereon. Afterwards either the adhesive tape will be removed or the cleaning tape will be severed at the anchored portion so that the free end of the cleaning tape on the takeup reel will no longer be anchored. Thus, after a predetermined number of cleanings has been conducted, the cleaning tape will be pulled free of supply reel 40. This will discourage rewinding of the cleaning tape onto supply reel 40 and subsequent reuse of the already used cleaning tape. This will not prevent such actions since the cover 34 can be removed and the cleaning tape rewound thereon; it will, however, make reuse less likely, thereby substantially ensuring that the head 14 will be cleaned only by previously unused cleaning tape.

OPERATION OF THE PRESENT INVENTION

To operate the present invention, a cleaning cartridge 10 in accordance therewith is inserted into tape drive 12. Upon insertion, head 14 will be moved into position to contact cleaning tape 46 and capstan 16 will rotate as previously mentioned a predetermined number of times dependent upon the manufacturer of the tape drive so as to take up any slack in the tape. This rotation of the capstan will, through the gear train 72, rotationally drive takeup reel 42, causing cleaning tape 46 to placed in tension as previously described. This tensioning of the cleaning tape 46 causes a force to be exerted against the back side 182 of shutter mechanism 122, thereby forcing it toward engagement side 160 against the biasing force of spring 124. Movement of shutter 15 mechanism 122 forward causes shelf 146 to block a light path, here light path 104, thereby creating a continuous "one-light-on/one-light-off" signal that the tape drive 12 recognizes through appropriate programming per manufacturer specifications as indicating that a cleaning cartridge 10 has been inserted into tape drive 12. Through tape drive manufacturer appropriate programming, tape drive 12 will be instructed to run at a predetermined, first reduced speed for a specified, predetermined time period, such as five seconds, thereby pulling cleaning tape 46 past head 14 in contact therewith for the aforesaid predetermined period at a significantly reduced and effective cleaning speed. During this cycle, tape drive 12 will also preferably take advantage of well-known, but not shown, apparatus incorporated into tape drive 12 for moving the head 14 vertically to move the head up and down through at least one cycle during the cleaning operation to ensure that all portions of the head 14 are properly cleaned. This movement is easily programmed along with the rest of the cleaning operation into the control system used to control tape drive 12 in all facets of its operation and is well within the skill of those knowledgeable in the art. Consequently, further explanation will not be given here since this programming will be manufacturer dependent and such explanation is not considered necessary to a thorough understanding of the present invention. As cleaning tape 46 moves past head 14 in contact therewith it will remove contaminants from the head 14. After the expiration of the predetermined cleaning period, the tape drive 12 will cease operation and capstan 16 will be run in reverse a predetermined number of revolutions, such as five, six or seven, thereby releasing the tension on the cleaning tape 46 and allowing spring 124 to return shutter mechanism 122 to its rest position. The cleaning operation will now be complete and cleaning cartridge 10 can be removed from the tape drive 12.

The cleaning tape 46 will preferably comprise a nylon weave type of material. The weave of such a cleaning tape contains a multitude of interstitial spaces or gaps between the treads of the weave where contaminant particles may be trapped. As the cleaning tape is pulled past the head 14 in contact therewith contaminants on the head will be trapped within those interstitial spaces and removed from the head, thereby cleaning it. These contaminant particles will then be carried to the takeup reel by the cleaning tape where they will be "stored" safely away from head 14.

As disclosed and claimed herein, a new and improved apparatus has been illustrated and described that solves many of the problems of prior art head cleaning devices. Because the present apparatus does not rely upon the addition of liquid solutions to a sponge, human intervention in the head cleaning process is no longer necessary and where desirable can be subject to automation. Thus, in a data library system appropriate equipment can monitor the length of time a particular read/write head has been operating and, after a predetermined time period, automatically insert a dry cleaning cartridge in accordance with the present invention into the tape drive for a head cleaning operation. Manufacturers will be able to specify as part of their equipment proper cleaning intervals and both manufacturers and customers or other end users will be assured that cleaning is occurring on the established schedule. In addition, for smaller users that do not have the need for such a library system, cleaning the head of a data backup drive will be as easy as inserting a data storage cartridge into the drive and allowing the cleaning operation to be carried through completely automatically. Tape drives intended primarily for individual use may be programmed to provide an appropriate on-screen message to a computer monitor to alert the user when cleaning of the head should occur. The individual user will thus also know when cleaning is scheduled to occur and can be assured that in fact the head is being timely and properly cleaned according to the tape drive manufacturer's specifications.

The present invention having thus been described, other modifications, alterations, or substitutions may now suggest themselves to those skilled in the art, all of which are within the spirit and scope of the present invention. For example, while the present invention has been described and illustrated relative to a 5 ¼" format tape drive of the type manufactured by Tandberg Data A/S of Norway, the general principles and features of the present invention may find use in a cleaning cartridge useful in a tape drive manufactured to read and write data from and to a 3 ½" format tape, which is the size and type commonly used in individual personal computers to backup data. It is therefore intended that the present invention be limited only by the scope of the claims that follow below.

What is claimed is:

1. A cleaning cartridge for removal of contaminants from a read/write head of a tape drive of a computer data backup system, said cartridge comprising:

a housing;

a supply of cleaning tape;

a supply reel for holding said supply of cleaning tape;

a takeup reel for holding used cleaning tape;

means for providing a predetermined cleaning tape pathway between said supply and takeup reels during a head cleaning operation; and means for receiving rotational driving power from a power source for the tape drive of the computer data backup system and for transmitting the received driving power to said takeup reel so as to pull said cleaning tape from said supply reel past the head without any driving contact with the cleaning tape, thereby cleaning the head and winding the used cleaning tape onto said takeup reel, wherein said means for receiving and transmitting driving power comprises a gear reduction system for reducing the speed of the cleaning tape past the head to a preselected speed;

wherein said cartridge housing completely encloses said supply of cleaning tape, supply reel, takeup reel, pathway means, predetermined tape pathway and said receiving and transmitting means.

2. The cleaning cartridge of claim 1 wherein the power source includes a capstan rotationally driven by an electric motor and said gear reduction system comprises:

a wheel for frictional engagement of the capstan for receiving rotational driving power therefrom;

a first spur gear integrally and concentrically attached to said wheel;

a plurality of spur gears extending between said first spur gear and said takeup reel;

wherein said takeup reel includes a hub and a pair of rims attached on opposing sides of said hub, one of said rims including a spur gear formed integrally thereon and forming the last gear in said gear reduction system such that said takeup reel rotationally engages the last of said plurality of spur gears.

3. The cleaning cartridge of claim 1 wherein said gear reduction system comprises a plurality of gears in driving engagement extending between said takeup reel and the power source.

4. The cleaning cartridge of claim 1 wherein said cleaning tape is normally under tension during the cleaning operation and said cleaning tape has a supply reel end, said supply reel end not being fixedly attached to said supply reel such that when a predetermined amount of cleaning tape has been used, said cleaning tape will lose tension during the cleaning operation and cleaning will cease.

5. The cleaning cartridge of claim 1 and further including means for substantially preventing free rotation of the supply reel.

6. The cleaning cartridge of claim 5 wherein said supply reel has a rim having a circumferential edge and said means for substantially preventing free rotation comprises a friction band having a side that bears against said circumferential edge with sufficient force to substantially prevent the free rotation of said supply reel.

7. The leaning cartridge of claim 6 wherein said friction band includes a pair of flanges extending under said rim of said supply reel, said flanges being separated by a gap substantially equal to the radius of said rim.

8. The cleaning apparatus of claim 6 wherein said friction band is attached at one end thereof to a spring and at the other end thereof to a pin attached to said housing, said spring being attached at opposing ends to said friction band and a pin attached to said housing and wherein said spring exerts a force on said friction band to pull said friction band into braking engagement with said circumferential edge so as to substantially prevent free rotation of said supply reel.

9. The cleaning cartridge of claim 1 and further including means for placing the cleaning tape under tension during operation.

10. The cleaning cartridge of claim 1 wherein said cleaning tape is normally under tension when said cleaning apparatus is operating and said cleaning tape has a supply reel end, said supply reel end not being fixedly attached to said supply reel, whereby after a predetermined number of cleanings, the cleaning tape will be pulled free of said supply reel, said cleaning tape will lose tension, and said cleaning cartridge will no longer be useable for cleaning.

11. A method of cleaning a contact-type transducing head of a tape drive system including a power source by using a cleaning cartridge, wherein said cleaning cartridge includes:

a housing;

a supply of cleaning tape;

a supply reel for holding said supply of cleaning tape;

a take-up reel for holding used cleaning tape;

means for providing a predetermined cleaning tape pathway between said supply and takeup reels;

means for receiving rotational driving power from said power source and for transmitting the received driving power to said takeup reel so as to pull said cleaning tape from said supply reel past the head in cleaning engagement therewith, thereby cleaning the head and winding the used cleaning tape onto said takeup reel; and wherein said housing encloses said supply of cleaning tape, supply reel, takeup reel, pathway means, predetermined cleaning tape pathway and said receiving and transmitting means;

wherein said power source comprises a capstan and means for reversibly, variably, and rotatably driving the capstan;

wherein said method comprises the following steps:
  inserting said cleaning cartridge holding cleaning tape into the tape drive system;
  rotating the capstan so as to transmit power to the means for receiving and transmitting power to the takeup reel, to advance the cleaning tape past the head in engagement therewith and to place the cleaning tape under tension with the cleaning tape remaining fully contained within the cleaning cartridge housing during the head cleaning operation; and; reducing the speed of the cleaning tape past the head to a preselected speed by the operation of the means for receiving and transmitting power to the takeup reel.

12. The method of claim 11 and further including the step of reversing the tape drive to release tension on the cleaning tape after a predetermined period of cleaning.

13. The method of claim 11 and further including the step of reversing the tape drive to release tension on the cleaning tape after a predetermined amount of cleaning tape has moved past the head.

14. The method of claim 11 and further including:
  moving the head up and down as the cleaning tape moves past the head in contact therewith.

15. The method of claim 11 wherein said means for receiving and transmitting driving power comprises a gear reduction system for reducing the received capstan rotation speed to a second reduced speed, said method further including:
  reducing the speed of the cleaning tape past the head to the second reduced speed by operation of said gear reduction system.

* * * * *